(12) United States Patent
Choi et al.

(10) Patent No.: US 12,314,851 B2
(45) Date of Patent: May 27, 2025

(54) MICROSERVICE-BASED TRAINING SYSTEMS IN HETEROGENEOUS GRAPHIC PROCESSOR UNIT (GPU) CLUSTER AND OPERATING METHOD THEREOF

(71) Applicant: ULSAN NATIONAL INSTITUTE OF SCIENCE AND TECHNOLOGY, Ulsan (KR)

(72) Inventors: Young Ri Choi, Ulsan (KR); Yeon Hyeok Jeong, Ulsan (KR); Seung Min Lee, Ulsan (KR); Seong Hyeon Jue, Ulsan (KR)

(73) Assignee: UNIST (Ulsan National Institute of Science and Technology), Ulsan (KR)

( * ) Notice: Subject to any disclaimer, the term of this patent is extended or adjusted under 35 U.S.C. 154(b) by 1025 days.

(21) Appl. No.: 17/340,639

(22) Filed: Jun. 7, 2021

(65) Prior Publication Data
US 2021/0390405 A1 Dec. 16, 2021

(30) Foreign Application Priority Data

Jun. 11, 2020 (KR) .................. 10-2020-0071021
May 10, 2021 (KR) .................. 10-2021-0060088

(51) Int. Cl.
*G06F 9/48* (2006.01)
*G06N 3/045* (2023.01)
*G06N 3/08* (2023.01)

(52) U.S. Cl.
CPC ............. *G06N 3/08* (2013.01); *G06F 9/4881* (2013.01); *G06N 3/045* (2023.01)

(58) Field of Classification Search
CPC .................................................. G06F 9/4881
See application file for complete search history.

(56) References Cited

U.S. PATENT DOCUMENTS

| 10,360,040 B2 | 7/2019 | Moloney et al. |
| 2012/0159507 A1 | 6/2012 | Kwon et al. |

(Continued)

FOREIGN PATENT DOCUMENTS

| KR | 1738641 B1 | 5/2017 |
| KR | 101794696 B1 | 11/2017 |

(Continued)

*Primary Examiner* — Charlie Sun
(74) *Attorney, Agent, or Firm* — Harness, Dickey & Pierce, P.L.C.

(57) ABSTRACT

Disclosed is a training system performing training on a plurality of neural network models in parallel. The training system includes a first job proxy that receives a training request for a first neural network model and partitions a first training job corresponding to the first neural network model into first microservices, a second job proxy that receives a training request for a second neural network model and partitions a second training job corresponding to the second neural network model into second microservices, a scheduler that dynamically schedules the first microservices and the second microservices so as to be executed by heterogeneous processing units, a cluster that includes the heterogeneous processing units, sequentially executes the first microservices and sequentially executes the second microservices, and a distributed in-memory database that stores parameters generated in response to the execution of the first microservices and the second micro services.

6 Claims, 7 Drawing Sheets

(56) References Cited

U.S. PATENT DOCUMENTS

2016/0094390 A1* 3/2016 Sirianni .............. G06F 16/1824
709/221
2018/0046497 A1* 2/2018 Al-Jarro .............. G06F 11/3096
2021/0326742 A1* 10/2021 Rosset ................... G06N 20/00

FOREIGN PATENT DOCUMENTS

KR            101950786 B1     2/2019
KR            102038390 B1    10/2019

* cited by examiner

MICROSERVICE-BASED TRAINING SYSTEMS IN HETEROGENEOUS GRAPHIC PROCESSOR UNIT (GPU) CLUSTER AND OPERATING METHOD THEREOF

CROSS-REFERENCE TO RELATED APPLICATIONS

This application claims priority under 35 U.S.C. § 119 to Korean Patent Application Nos. 10-2020-0071021 filed on Jun. 11, 2020 and 10-2021-0060088 filed on May 10, 2021, in the Korean Intellectual Property Office, the disclosures of which are incorporated by reference herein in their entireties.

BACKGROUND

Embodiments relate to a microservice-based training system using a heterogeneous graphic processor unit cluster and an operating method thereof.

A work to train one deep neural network (DNN) may monopolize multiple graphic processing units (hereinafter referred to as "GPUs") for a long time. For example, in the case where, like a multi-tenant, multiple users make use of the same function or one software instance services the users sharing the access authority while running on one server, a GPU once allocated to the corresponding work is continuously used. For this reason, the locality between allocated GPUs is important. However, scheduling may be continuously delayed for the locality between GPUs. Here, the locality may be understood as spatial proximity, for example, as GPUs executing the same training job are placed adjacent to the same node or rack. In the case where GPUs are closely placed, the communication overhead decreases. In particular, multiple training jobs may be simultaneously executed in a heterogeneous cluster composed of different kinds of GPUs. In this case, the determination of jobs to be allocated to heterogeneous GPUs to improve overall system performance and performance of each job may become more complicated. Also, in the case of performing data parallelization-based training in a heterogeneous cluster, the performance may be reduced by a straggler issue.

For example, in microservice systems, which are widely used in recent years, such as Amazon Lambda and Google Cloud function, a current microservice system may have advantages such as flexibility in using resources and low load overhead, by executing computation by using a microservice being a function unit. Nevertheless, it is difficult to utilize the current microservice system in training a deep neural network running in a monolithic manner.

The above-described background technology that is possessed or acquired by the inventor in the process of deriving the contents of the present disclosure is not necessarily the known art disclosed to the general public before the present application.

SUMMARY

According to an embodiment, multiple training jobs may be more efficiently executed by using one heterogeneous-GPU cluster.

According to an embodiment, a deep neural network composed of a cluster including heterogeneous graphic processing units may be trained through microservice-based machine learning.

According to an embodiment, a complex deep learning model may be trained more efficiently by partitioning the deep learning model by a function unit of a microservice concept and training the deep learning model in heterogeneous processors.

According to an embodiment, machine learning may be performed more efficiently by scheduling microservices depending on performance of heterogeneous processors.

According to an embodiment, training of a monolithic deep neural network model may be performed by modularizing the neural network model based on microservices such that there is performed distributed processing using a cluster including heterogeneous graphic processing units.

According to an embodiment, there may be provided a training system having high fairness, scalability, efficiency, and elasticity by reducing the complexity of managing heterogeneous resources in a multi-tenant graphic processing unit cluster supporting a plurality of training jobs at the same time.

According to an embodiment, a training system which performs training on a plurality of neural network models in parallel includes a first job proxy that receives a training request for a first neural network model and partitions a first training job corresponding to the first neural network model into first microservices, a second job proxy that receives a training request for a second neural network model and partitions a second training job corresponding to the second neural network model into second microservices, a scheduler that dynamically schedules the first microservices and the second microservices so as to be executed by heterogeneous processing units, a cluster that includes the heterogeneous processing units, sequentially executes the first microservices and sequentially executes the second microservices, and a distributed in-memory database that stores parameters generated in response to the execution of the first microservices and the second micro services.

According to an embodiment, an operating method of a training system which performs training on a plurality of neural network models in parallel includes receiving a training request for the plurality of neural network models including a first neural network model and a second neural network model, partitioning a first training job corresponding to the first neural network model into first microservices, partitioning a second training job corresponding to the second neural network model into second microservices, dynamically scheduling the first microservices and the second microservices so as to be executed by heterogeneous processing units, and sequentially executing the first microservices and sequentially executing the second microservices.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments will be described with reference to the accompanying drawings. However, the embodiments will be variously changed, so the scope and spirit of the invention is not limited to or by the embodiments. It should be understood that all changes, equivalents, or substitutes to the embodiments are included in the scope and spirit of the invention.

Figure 1A:
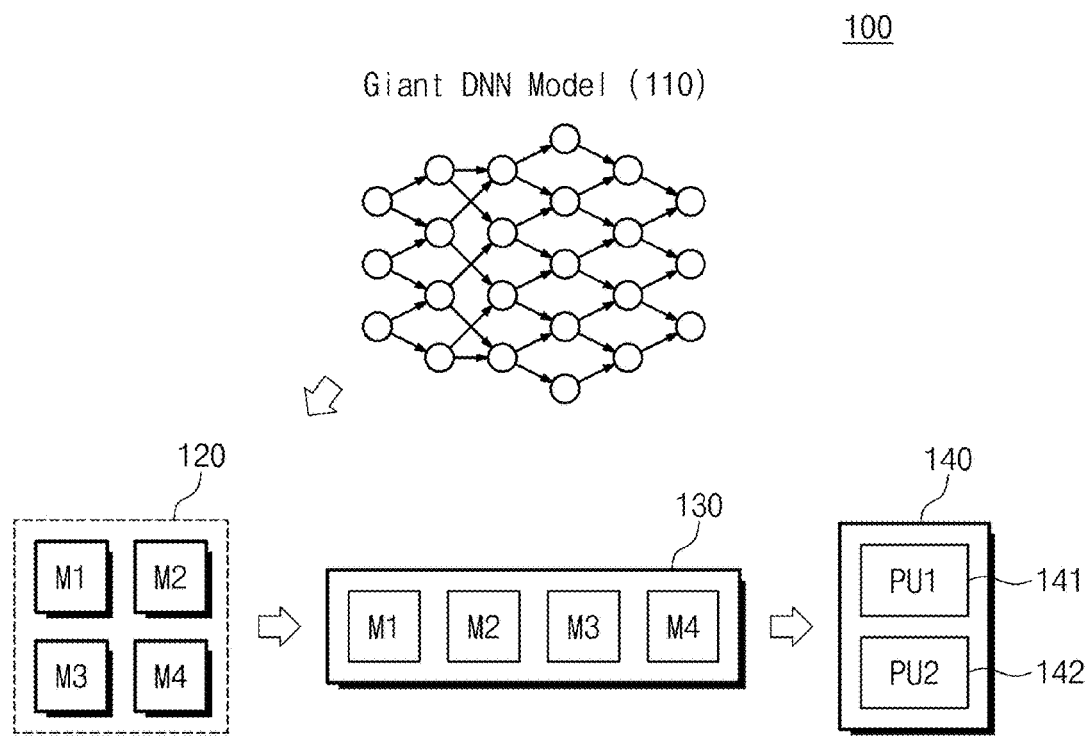
FIGS. 1A to 1D are diagrams for describing an operation concept of a training system according to an embodiment.
Figure 1B:
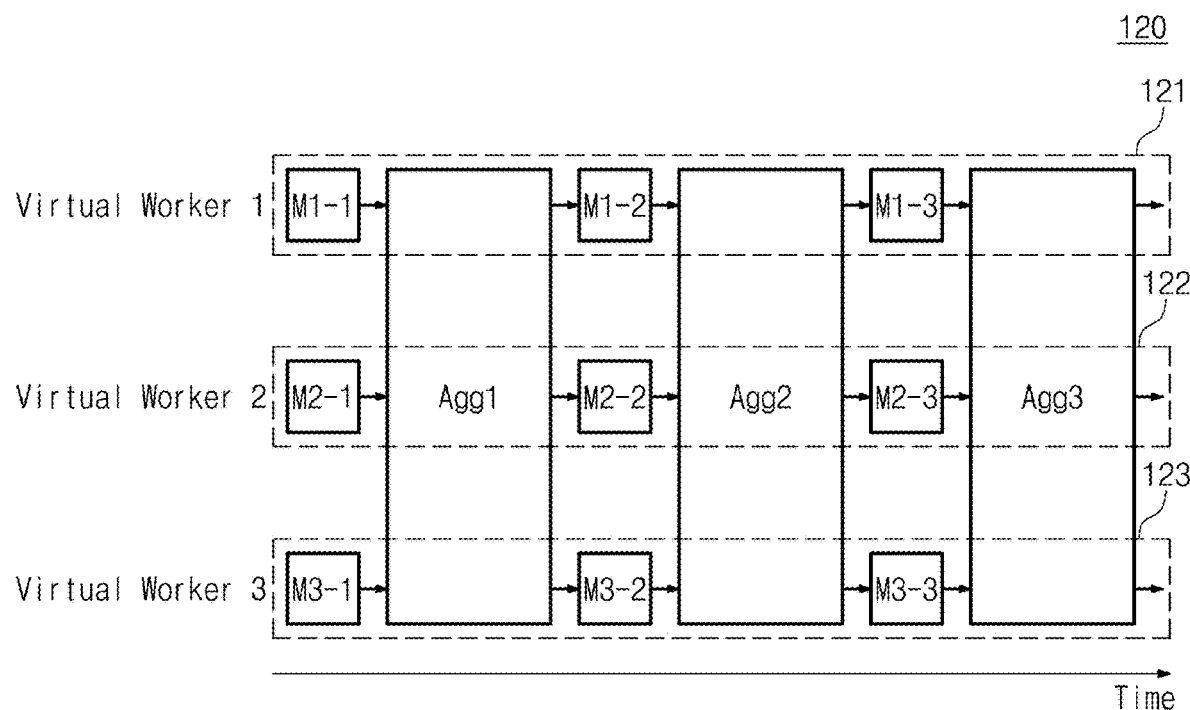
Figure 1C:
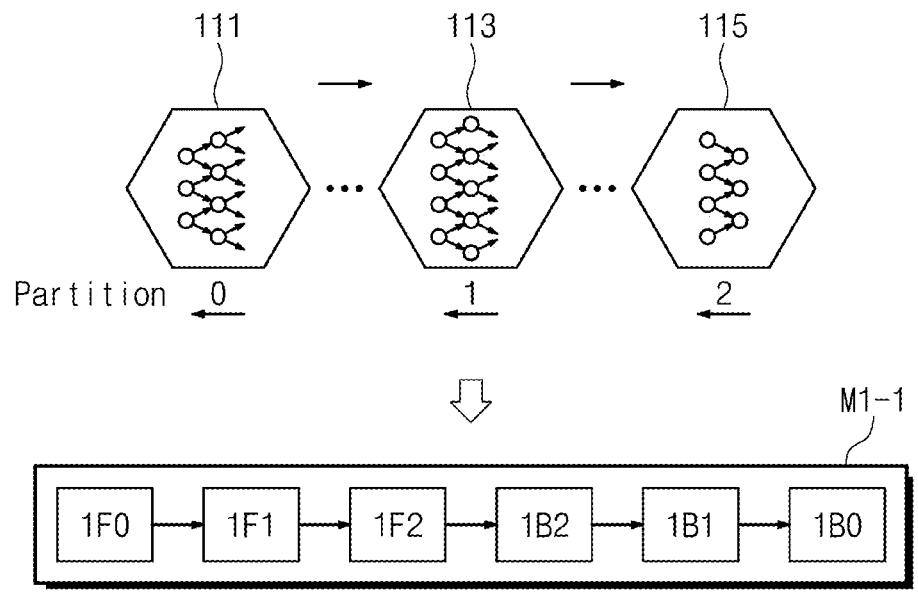
Figure 1D:
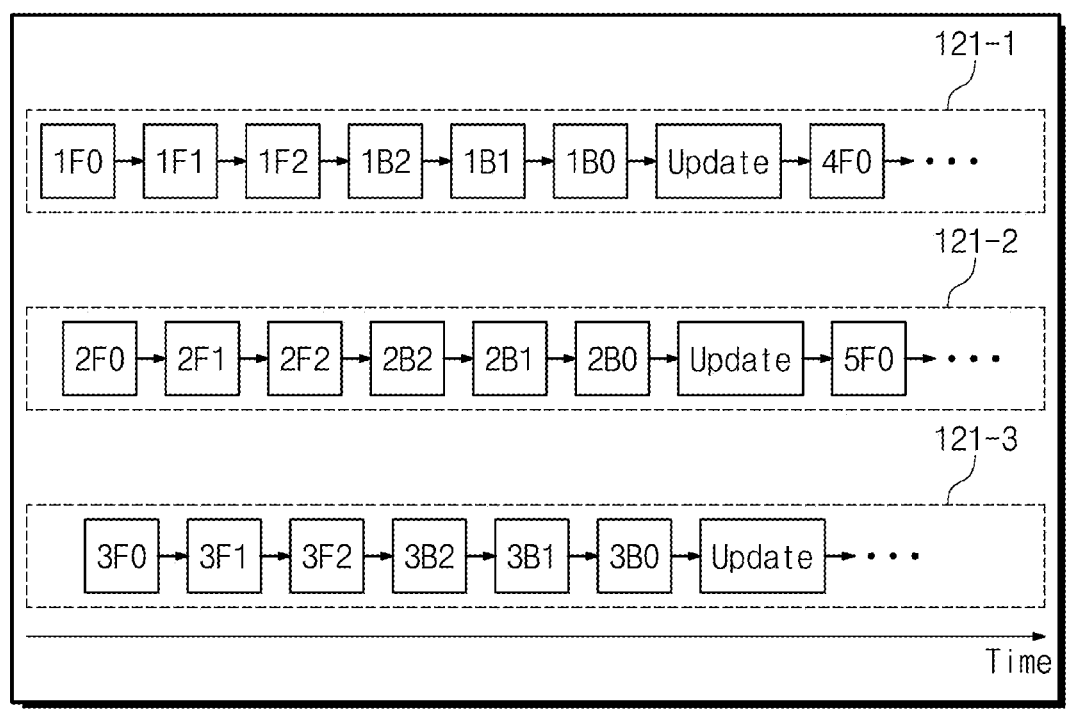

FIGS. 1A to 1D are diagrams for describing an operation concept of a training system according to an embodiment. FIG. 1A is a diagram schematically illustrating a training process of a training system 100, and FIGS. 1B and 1C are detailed examples of a training job 120.

Referring to FIG. 1A, the training system 100 may perform training on a neural network model. According to an embodiment, the neural network model may be a giant deep neural network (DNN) model 110. The giant DNN model 110 may be trained by the training system 100, which is referred to as a "training job".

A training job of the machine learning may be executed by one worker or may be executed by multiple workers for performance improvement. Here, a worker may be, for example, a graphic processing unit (GPU). However, in the present disclosure, the concept of a virtual worker may be used in performing a training job in the form of multiple microservices. The virtual worker will be described in more detail with reference to FIGS. 1B to 1D.

The training job 120 may include a plurality of microservices M1, M2, M3, and M4. A microservice may be a computation unit, that is, one function in a microservice system, and one application may be executed by a sequence of microservices. According to an embodiment, in the training system 100 in which training data include a plurality of mini-batches, the microservice may be processing of one mini-batch, for example, a forward pass or a backward pass for one mini-batch. Alternatively, the microservice may be a processing sequence of a plurality of mini-batches.

That is, the microservice may only mean one processing unit in the training system 100, and a target to be processed by the microservice may vary with an embodiment. In the training system 100, the training job 120 for training the giant DNN model 110 may be executed in a sequence of the microservices M1, M2, M3, and M4 being works of a function unit. The training system 100 may submit the microservices M1, M2, M3, and M4 to a scheduler 130.

The scheduler 130 may add the microservices M1, M2, M3, and M4 to a queue (not illustrated) of the scheduler 130. The scheduler 130 may dynamically schedule the microservices M1, M2, M3, and M4 so as to be executed by a cluster 140. The scheduling of the scheduler 130 may be made in consideration of the locality of each of the microservices M1, M2, M3, and M4, the throughput of a neural network model, the quality of service (QoS), etc.

The cluster 140 may execute the training job 120 to train the giant DNN model 110. The cluster 140 may include a plurality of processing units 141 and 142. The processing units 141 and 142 may include, for example, graphic processing units (GPUs) or central processing units (CPUs). Also, the processing units 141 and 142 may be, for example, homogeneous processing units or may be heterogeneous processing units.

According to an embodiment, the training system 100 may execute a plurality of training jobs by using the cluster 140. Each of the plurality of training jobs may be modularized to a plurality of microservices. To this end, each microservice may be dynamically scheduled to be executed by an available processing unit among the processing units 141 and 142 of the cluster 140.

Referring to FIGS. 1A and 1B, the training job 120 may include a first task 121, a second task 122, and a third task 123. According to an embodiment, the first task 121, the second task 122, and the third task 123 may be partitioned for each mini-batch. The first task 121, the second task 122, and the third task 123 may be executed in parallel by a plurality of virtual workers Virtual Worker 1, Virtual Worker 2, and Virtual Worker 3.

That the plurality of virtual workers Virtual Worker 1, Virtual Worker 2, and Virtual Worker 3 execute the first task 121, the second task 122, and the third task 123 may mean to perform training on the giant DNN model 110 by executing the training job 120. For convenience of description, an example in which the number of virtual workers is 3, but the present disclosure is not limited thereto. For example, the training system 100 may execute the training job 120 by using one virtual worker.

A virtual worker may not actually exist, but it may be a concept executed in a sequence of microservices. A virtual worker may replace a typical worker by a GPU by sequentially executing microservices. However, unlike a typical worker, a virtual worker may be executed in a state of being decoupled from a physical GPU.

According to an embodiment, through the plurality of virtual workers Virtual Worker 1, Virtual Worker 2, and Virtual Worker 3, the training system 100 may execute a training job in the form of modularized microservices, without allocation of a dedicated GPU. For example, the first to third virtual workers Virtual Worker 1, Virtual Worker 2, and Virtual Worker 3 may execute the first to third tasks 121, 122, and 123, respectively. Each of the first to third tasks 121, 122, and 123 may include a plurality of microservices.

The first task 121 may be executed by the first virtual worker Virtual Worker 1. The first task 121 may include microservices M1-1, Agg1, M1-2, Agg2, M1-3, and Agg3. The first virtual worker Virtual Worker 1 may sequentially execute the microservices M1-1, Agg1, M1-2, Agg2, M1-3, and Agg3.

The second task 122 may be executed by the second virtual worker Virtual Worker 2. The second task 122 may include microservices M2-1, Agg1, M2-2, Agg2, M2-3, and Agg3. The second virtual worker Virtual Worker 2 may sequentially execute the microservices M2-1, Agg1, M2-2, Agg2, M2-3, and Agg3.

The third task 123 may be executed by the third virtual worker Virtual Worker 3. The third task 123 may include microservices M3-1, Agg1, M3-2, Agg2, M3-3, and Agg3. The third virtual worker Virtual Worker 3 may sequentially execute the microservices M3-1, Agg1, M3-2, Agg2, M3-3, and Agg3.

The training job 120 may be partitioned into the first task 121, the second task 122, and the third task 123 based on microservices, so as to be executed in parallel by the plurality of virtual workers Virtual Worker 1, Virtual Worker 2, and Virtual Worker 3. This may indicate the efficiency corresponding to the execution of the training job 120 through three GPUs. However, when the size of a training model is equal to or larger than a given size, there is a need to improve the efficiency of work of a virtual worker by partitioning the training model itself into sub-models. This will be described in more detail with reference to FIG. 1C.

According to an embodiment, microservices may be partitioned into first-type microservices M1-1, M1-2, M1-3, M2-1, M2-2, M2-3, M3-1, M3-2, and M3-3 and second-type microservices Agg1, Agg2, and Agg3. The first-type microservices M1-1, M1-2, M1-3, M2-1, M2-2, M2-3, M3-1, M3-2, and M3-3 may be works in which the plurality of virtual workers Virtual Worker 1, Virtual Worker 2, and Virtual Worker 3 calculate weights.

The first-type microservices may include first partial microservices M1-1, M2-1, and M3-1, second partial microservices M1-2, M2-2, and M3-2, and third partial microservices M1-3, M2-3, and M3-3. The first partial microservices M1-1, M2-1, and M3-1, the second partial microservices M1-2, M2-2, and M3-2, and the third partial microservices M1-3, M2-3, and M3-3 may be executed in parallel by the plurality of virtual workers Virtual Worker 1, Virtual Worker 2, and Virtual Worker 3.

The second-type microservices Agg1, Agg2, and Agg3 may be works in which weights calculated by the plurality of virtual workers Virtual Worker 1, Virtual Worker 2, and Virtual Worker 3 are aggregated. The second-type microservices Agg1, Agg2, and Agg3 may be together performed by the plurality of virtual workers Virtual Worker 1, Virtual Worker 2, and Virtual Worker 3.

Referring to FIG. 1B, the plurality of virtual workers Virtual Worker 1, Virtual Worker 2, and Virtual Worker 3 may calculate first weights by executing the first partial microservices M1-1, M2-1, and M3-1 in parallel and may aggregate the first weights by executing the second-type microservice Agg1. Next, the plurality of virtual workers Virtual Worker 1, Virtual Worker 2, and Virtual Worker 3 may calculate second weights by executing the second partial microservices M1-2, M2-2, and M3-2 in parallel and may aggregate the second weights by executing the second-type microservice Agg2. Finally, the plurality of virtual workers Virtual Worker 1, Virtual Worker 2, and Virtual Worker 3 may calculate third weights by executing the third partial microservices M1-3, M2-3, and M3-3 in parallel and may aggregate the third weights by executing the second-type microservice Agg3.

In other words, the first partial microservices M1-1, M2-1, and M3-1, the second partial microservices M1-2, M2-2, and M3-2, and the third partial microservices M1-3, M2-3, and M3-3 may be executed in parallel by the plurality of virtual workers Virtual Worker 1, Virtual Worker 2, and Virtual Worker 3 at different timings.

Referring to FIGS. 1A to 1C, the giant DNN model 110 may be partitioned into first to third sub-models 111, 113, and 115. For convenience of description, an example in which the number of sub-models is 3 is illustrated, but the number of sub-models is not limited thereto. The first to third sub-models 111, 113, and 115 may be trained by the cluster 140.

The training job 120 may be a process in which the first sub-model 111, the second sub-model 113, and the third sub-model 115 calculate parameters through iterative operations between the forward pass and the backward pass. A parameter may correspond to a weight that is applied to each layer of a neural network in training. Below, the "parameter" may be understood as the same meaning as the "weight".

According to an embodiment, the training job 120 may be a process of generating parameters by iteratively processing one mini-batch or a plurality of mini-batches. In the giant DNN model 110, a size of a parameter may be equal to or larger than a given size. In this case, because it is difficult for one processing unit to process the giant DNN model 110, the giant DNN model 110 may be distributed into and processed by a plurality of processing units. In this case, processing of a mini-batch may be composed of a forward pass and a backward pass.

Why to use a mini-batch is as follows. For example, it is assumed that the number of training data is 200. A training system may train a neural network model by computing a loss due to a difference between the 200 training data and a value, which the neural network model predicts, and then updating a weight of the neural network model such that the loss is minimized. In this case, the 200 training data may be partitioned, for example, in units of 32, and each unit thus partitioned may correspond to a mini-batch. That is, the training system may update a weight within a fast time by using a mini-batch such that the amount of computation is reduced. In the case of using a mini-batch, because each cluster or processing unit computes a loss of a neural network with respect to 32 training data, not 200 training data, and then updates a weight, each cluster or processing unit may complete training within a fast time.

According to an embodiment, the microservice M1-1 may be subdivided into microservices 1F0, 1F1, 1F2, 1B2, 1B1, and 1B0 corresponding to the first to third sub-models 111, 113, and 115 with regard to one mini-batch. In each microservice, "F" may indicate that the corresponding microservice is a work corresponding to a forward pass, and "B" may indicate that the corresponding microservice is a work corresponding to a backward pass. For example, the microservice 1F0 may mean a work corresponding to a forward pass in the first sub-model 111 with regard to a first mini-batch. For example, the microservice 1B2 may mean a work corresponding to a backward pass in the third sub-model 115 with regard to the first mini-batch.

According to an embodiment, each of the plurality of virtual workers Virtual Worker 1, Virtual Worker 2, and Virtual Worker 3 may not only process one mini-batch, but may also process a plurality of mini-batches at the same time such that the efficiency of work is improved.

Referring to FIGS. 1A to 1D, the first virtual worker Virtual Worker 1 may simultaneously process a plurality of mini-batches by executing a plurality of microservices in a pipeline manner.

The first task 121 may include a first sub-task 121-1, a second sub-task 121-2, and a third sub-task 121-3. The first virtual worker Virtual Worker 1 may process the first sub-task 121-1, the second sub-task 121-2, and the third sub-task 121-3 at the same time and/or in parallel. The first to third sub-tasks 121-1, 121-2, and 121-3 processed by the first virtual worker Virtual Worker 1 may be aggregated so as to be output as a training result.

Each of the first to third sub-tasks 121-1, 121-2, and 121-3 may include microservices performing works for training. For example, the first sub-task 121-1 may include the microservices 1F0, 1F1, 1F2, 1B2, 1B1, and 1B0 processing the first mini-batch and a microservice Update performing an update. The microservices 1F0, 1F1, 1F2, 1B2, 1B1, and 1B0 processing the first mini-batch are similar to the microservices 1F0, 1F1, 1F2, 1B2, 1B1, and 1B0 of FIG. 1C, and thus, additional description will be omitted to avoid redundancy. The microservice Update performing an update may correspond to a process of updating parameters calculated within the first virtual worker Virtual Worker 1 so as to be used by any other virtual worker. According to an embodiment, the microservice Update performing an update may correspond to one of the second-type microservices Agg1, Agg2, and Agg3 of FIG. 1B.

The description given with reference to the first sub-task 121-1 may be applied to the second sub-task 121-2 and the third sub-task 121-3. For example, the second sub-task 121-2 may include microservices 2F0, 2F1, 2F2, 2B2, 2B1, and 2B0 processing a second mini-batch and a microservice Update performing an update. For example, the third sub-task 121-3 may include microservices 3F0, 3F1, 3F2, 3B2, 3B1, and 3B0 processing a third mini-batch and a microservice Update performing an update. The first virtual worker Virtual Worker 1 may execute the first to third sub-tasks 121-1, 121-2, and 121-3 in a pipeline manner such that the first to third mini-batches are processed at the same time and/or in parallel. That is, the first virtual worker Virtual Worker 1 may improve the efficiency of work through microservice-based task parallelization.

Figure 2:
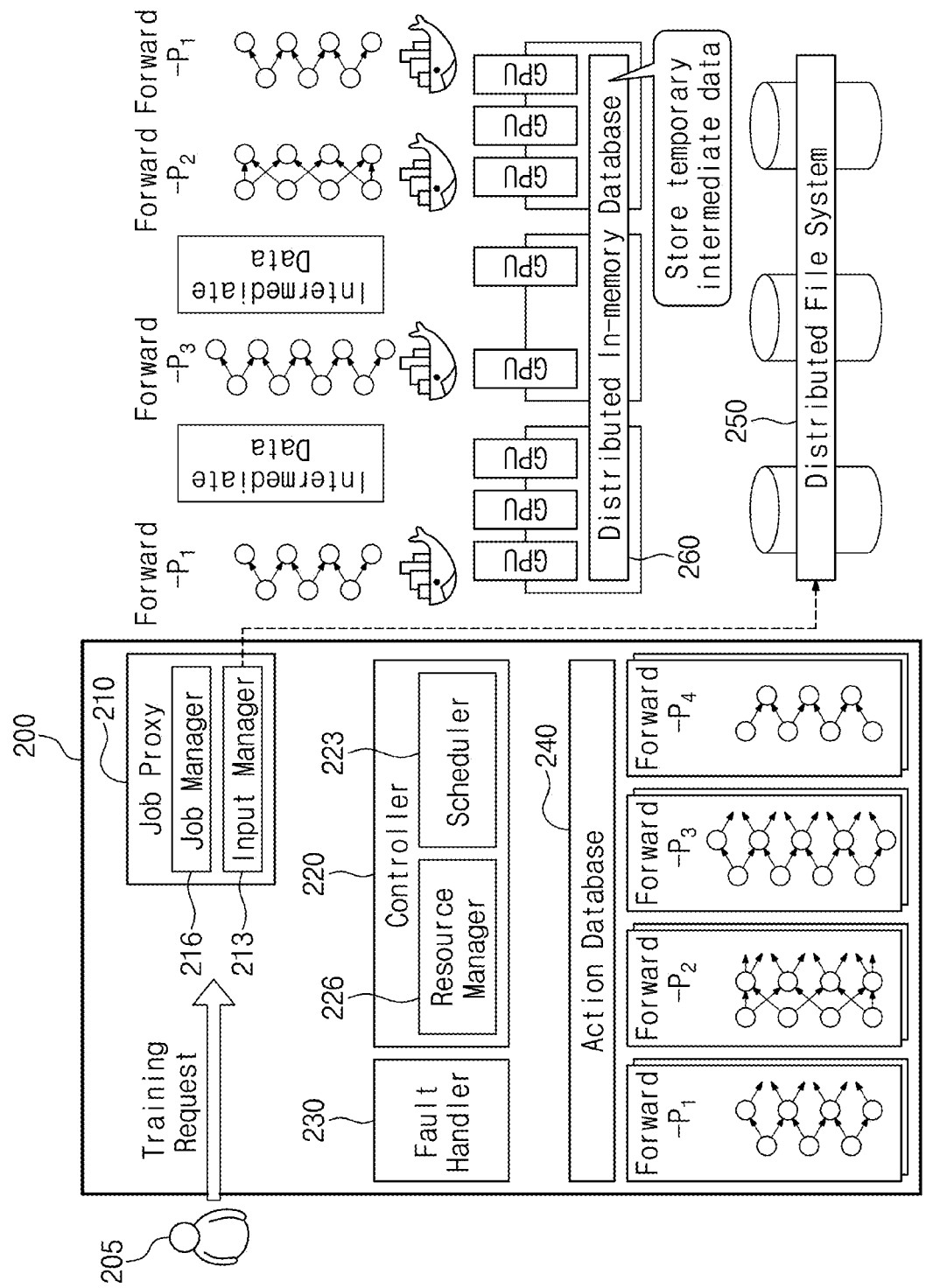
FIG. 2 is a diagram illustrating a configuration of a training system according to an embodiment.

FIG. 2 is a diagram illustrating a configuration of a training system according to an embodiment. Referring to FIG. 2, a training system 200 according to an embodiment may include, for example, a job proxy 210, a controller 220, a fault handler 230, and an action database 240. Also, the training system 200 may further include a distributed file system 250 and a distributed in-memory database 260. A "whale icon" illustrated in FIG. 2 may mean, for example, a container such as a docker.

The training system 200 partitions a training job into tasks corresponding to virtual workers of a neural network model. In this case, the tasks may be performed by microservices. The training system 200 trains the neural network model by scheduling the microservices so as to be executed by heterogeneous graphic processing units included in each of clusters for the neural network model. An operation of each component of the training system 200 associated with the above training (or scheduling) is as follows.

The job proxy 210 may perform pre-processing on training data for neural network training. Here, the pre-processing may be, for example, partitioning the training data in units of microservice. Also, one input data may be used to train one neural network model or multiple neural network models. In the case where there are plural jobs, the training system 200 may generate the job proxy 210 for each job. The job proxy 210 may partition tasks into microservices depending on a computation type for the pre-processed training data.

The job proxy 210 may include an input manager 213 and a job manager 216.

When training data are input from a user 205 together with a training request, the input manager 213 may store the input training data in the distributed file system 250 and may cause each microservice to process the training data through pre-processing.

The input manager 213 may process the training data in a form corresponding to microservices. The input manager 213 may partition, for example, the training data for each task or may partition the training data in units of micro service.

The job manager 216 may classify, for example, the partitioned microservices into microservices calculating parameters and microservices aggregating the parameters. Also, the job manager 216 may transfer information about the classified microservices to a scheduler 223. For example, the job manager 216 may transfer, to the scheduler 223, a computation type (e.g., parameter calculation or parameter aggregation) of the classified microservices, information of a mini-batch to be processed, and information necessary for scheduling including an iteration count.

As described above, virtual workers may train sub-models replicated by tasks allocated thereto. In this case, final parameters in which a training process is completed may be stored, for example, in the distributed file system 250. Also, intermediate data, such as a parameter, a gradient, and an activation output of the neural network model locally computed in the training process, or a parameter globally shared in the training process may be stored, for example, in the distributed in-memory database 260. Parameters may be shared between virtual workers in iterative processing of the training process, and various parameter (i.e., weight) synchronization policies may exist.

The job manager 216 may classify microservices depending on computation types, based on a parameter synchronization policy. In this case, the parameter synchronization policy may include, for example, synchronization policies using a BSP (Bulk Synchronous Parallel) mode, an ASP (Asynchronous Parallel) model, and an SSP (Stale Synchronous Parallel) model. The BSP model uses barrier synchronization, and a virtual worker that reaches a barrier waits until all other virtual workers arrive. As such, the synchronization is performed together at all the virtual workers. The ASP model may synchronize weights for respective virtual workers regardless of working speeds of other virtual workers. The SSP model performs synchronization but relaxes strict synchronization requirements of the BSP model. As such, the SSP model provides an intermediate approach between the ASP model and the BSP mode. In principle, the SSP model may monitor an iteration difference between the fastest virtual worker and the slowest virtual worker and may cause the fastest virtual worker to wait until the synchronization is possible so as to be within a threshold. In an embodiment, neural network training may be performed by dynamically changing a synchronization policy, such as the aforementioned BSP, ASP, or SSP model, based on a resource situation or a characteristic of a neural network model.

The job manager 216 may transfer the information about the classified microservices to the scheduler 223, based on the synchronization policy for parameters generated by the training. For example, a value of a parameter of the neural network model may be calculated whenever each mini-batch is processed. When mini-batches are processed by multiple virtual workers, values of parameters have to be aggregated depending on the synchronization policy. The job manager 216 may generate a microservice performing the aggregation work depending on the above synchronization policy and may transfer the microservice to the scheduler 223.

The controller 220 may schedule the microservices partitioned by the job proxy 210 so as to be executed by heterogeneous graphic processing units, and may perform resource management, such as resource allocation, based on the scheduling.

The controller 220 may include, for example, the scheduler 223 and a resource manager 226.

The scheduler 223 may schedule a plurality of microservices so as to be executed by heterogeneous graphic processing units (GPUs) included in a cluster. Based on a locality of each microservice, an interference between microservices of different kinds of tasks executed within the same cluster, accuracy of a neural network model, a throughput of the neural network model, and a quality of service (QoS) including a required time of the microservices, for example, the scheduler 223 may schedule microservices so as to be executed by heterogeneous graphic processing units. Here, that the scheduling of the microservices is based on a locality of each of the microservices may be understood as a meaning that multiple microservices executed as one job are scheduled (or placed) to be close to each other in location or distance.

The locality of each of the microservices may correspond, for example, to a distance from intermediate data that each of the microservices will use. A location of intermediate data, which a microservice will use and which are stored in a distributed in-memory database, and a location on a cloud of a machine, which includes a GPU by which the microservice will be executed, may belong to the same machine, may belong to different machines in the same rack, or may belong to machines in different racks. As scheduling is performed in consideration of the above condition, a time taken for data to move may decrease, and the efficiency of training may be maximized.

Also, a meaning that the scheduling of the microservices is based on the interference between the microservices is as follows. For example, in the case where one node is configured to include a multi-core and a multi-GPU, multiple microservices may be simultaneously executed at one node. When multiple microservices are simultaneously executed at one node, the reduction of performance may be caused by the situation (i.e., interference) that the microservices competitively use a physical resource (e.g., a host memory, a network, or a PCI-e) of the same node. In this case, the multiple microservices may be scheduled such that the interference between microservices of different kinds of tasks is minimized.

In addition, the scheduler 223 may utilize a heterogeneous-GPU resource depending on the quality of service for costs and performance that the user specifies. For example, in the case where the corresponding job or microservices require high performance, the scheduler 223 may place a high-performance GPU in a GPU cluster for the corresponding job or microservices.

Also, in consideration of a resource situation, the scheduler 223 may schedule multiple jobs so as to be executed by the same cluster. In this case, the capacity for the cluster to perform an individual job may decrease, but the utilization of the cluster may be maximized.

For example, in the case where a neural network model requires the throughput of a certain level or higher, for example, in the case where there is a need to satisfy a specific QoS, the scheduler 223 may monitor a state of a cluster performing a job and may schedule a job, which does not meet the criterion, so as to be executed by any other resource.

According to an embodiment, the scheduler 223 may dynamically schedule one of a forward pass and a backward pass of a mini-batch that each virtual worker processes through microservices, so as to be executed by heterogeneous processing units. Alternatively, based on a synchronization policy for parameters that are generated by the training of a mini-batch that each virtual worker processes through microservices, the scheduler 223 may dynamically schedule a microservice, which aggregates parameters corresponding to the mini-batch processed at each virtual worker, so as to be executed by heterogeneous processing units.

In general, in the case of processing multiple training jobs, when a running job is executed for a long time, a newly provided job may wait until a previous job is finished or may be performed through a complex process such as preemption. In contrast, according to an embodiment, in the case of processing multiple training jobs by using microservices, a job is modularized and executed, and thus, scheduling of a microservice of a newly provided is immediately possible without preemptive processing of the running job. The above manner according to an embodiment may improve the fairness in using resources.

For example, when the amount of resources to be used needs to be reduced depending the fairness of the corresponding job, the job manager 216 may determine a state of a cluster and may reduce the number of virtual workers, thus making it possible to continuously provide microservices. Alternatively, when resources remain in a cluster, the job manager 216 may increase the efficiency of resource by increasing the number of virtual workers and may also increase elasticity in resource utilization. In an embodiment, by dynamically processing jobs based on microservices, scheduling that is based on the fairness between jobs is possible. Also, according to an embodiment, the scalability of resource management may be improved by scheduling each microservice in resource management and scheduling as a whole.

The resource manager 226 may dynamically adjust the number of virtual workers to be used, depending on the scheduling of the scheduler 223. The resource manager 226 may dynamically adjust the number of virtual workers corresponding to a job, for example, based on a resource use state of each of clusters. For example, when there are plural jobs, the resource manager 226 may add a virtual worker for a specific job to efficiently use many resources remaining on the cloud, and thus, the throughput of the training system may be improved.

The fault handler 230 may detect a microservice, in which a fault occurs, from among microservices and may again perform an operation of the detected microservice.

The action database 240 may store an action that is an execution unit corresponding to a result of partitioning an existing monolithic training job small by a function unit of a microservice. The action may be a part of a forward pass or backward pass process or may be a process of processing a parameter.

The distributed file system 250 may store, for example, training data for training, and permanent data such as a final parameter after the training is finished. The training data may be, for example, training data that the input manager 213 receives from the user 205. The distributed file system 250 may be, for example, a Hadoop distributed file system (HDFS).

The distributed in-memory database 260 may store, for example, intermediate data such as a gradient locally computed in the training process. The distributed in-memory database 260 may be implemented, for example, with a redis cluster being simple map data storage in which a key and a value are mapped. The redis cluster that is key-value storage may be, for example, a NoSQL that supports various formats of data structures such as a list, a hash, and an aligned set. The redis cluster may be mainly used as a cache resolution of a relational database management system (RDBMS) while being resident on memories of different clusters or processing units of different clusters.

Figure 3:
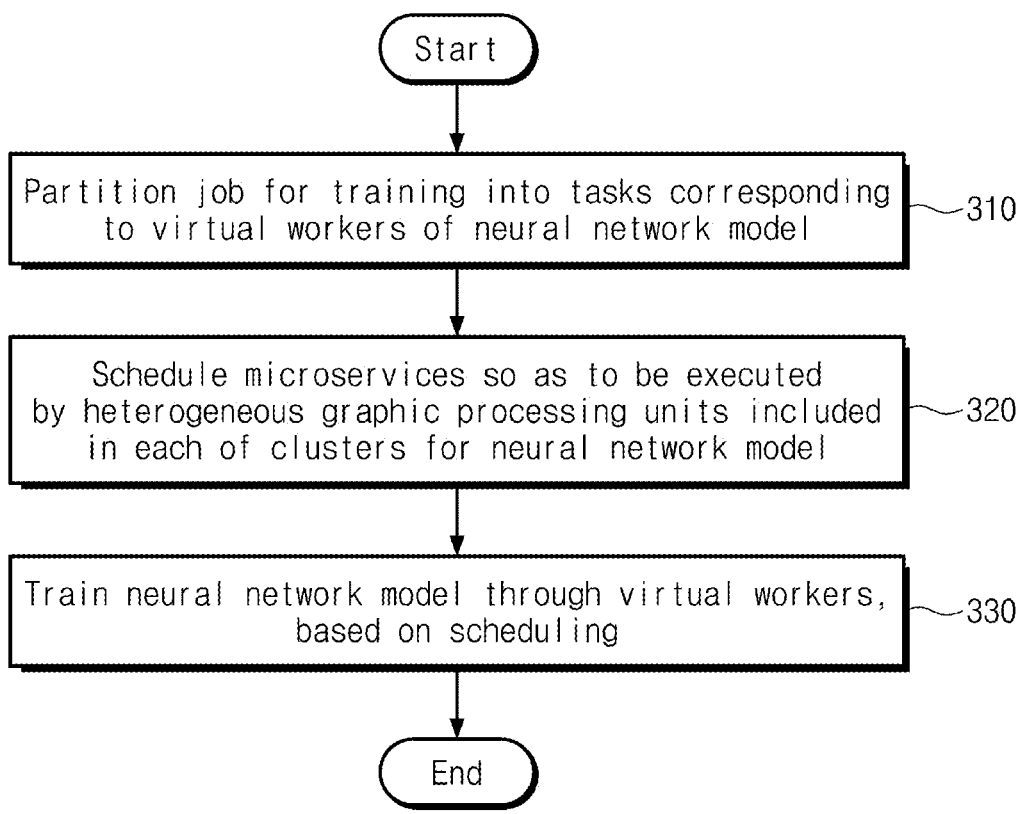
FIG. 3 is a flowchart illustrating an operating method of a training system according to an embodiment.

FIG. 3 is a flowchart illustrating an operating method of a training system according to an embodiment. Referring to FIG. 3, a training system according to an embodiment may partition a job for training into tasks corresponding to virtual workers of a neural network model (310). The tasks are performed by microservices. For example, the job may be partitioned into one or more mini-batches constituting at least one of a forward pass or a backward pass.

The training system schedules the microservices so as to be executed by heterogeneous graphic processing units included in each of clusters for the neural network model (320). The training system may perform, for example, pre-processing on the training data for the training and may partition the tasks into microservices depending on computation types for the pre-processed training data. The training system may schedule the microservices so as to be executed by heterogeneous graphic processing units. The training system may classify, for example, the tasks into a first computation type of microservice performing training and a second computation type of microservice calculating a parameter according to the training. The training system may transfer, for example, information about the classified microservices to a scheduler, based on a synchronization policy for parameters generated by the training.

Alternatively, based on a synchronization policy for parameters generated by the training of a mini-batch that each virtual worker processes through microservices, the training system may dynamically schedule, for example, a plurality of microservices so as to be executed by heterogeneous processing units.

The training system may allocate resources depending on the scheduling.

The training system trains the neural network model through the virtual workers, based on the scheduling of operation 320 (330).

Figure 4A:
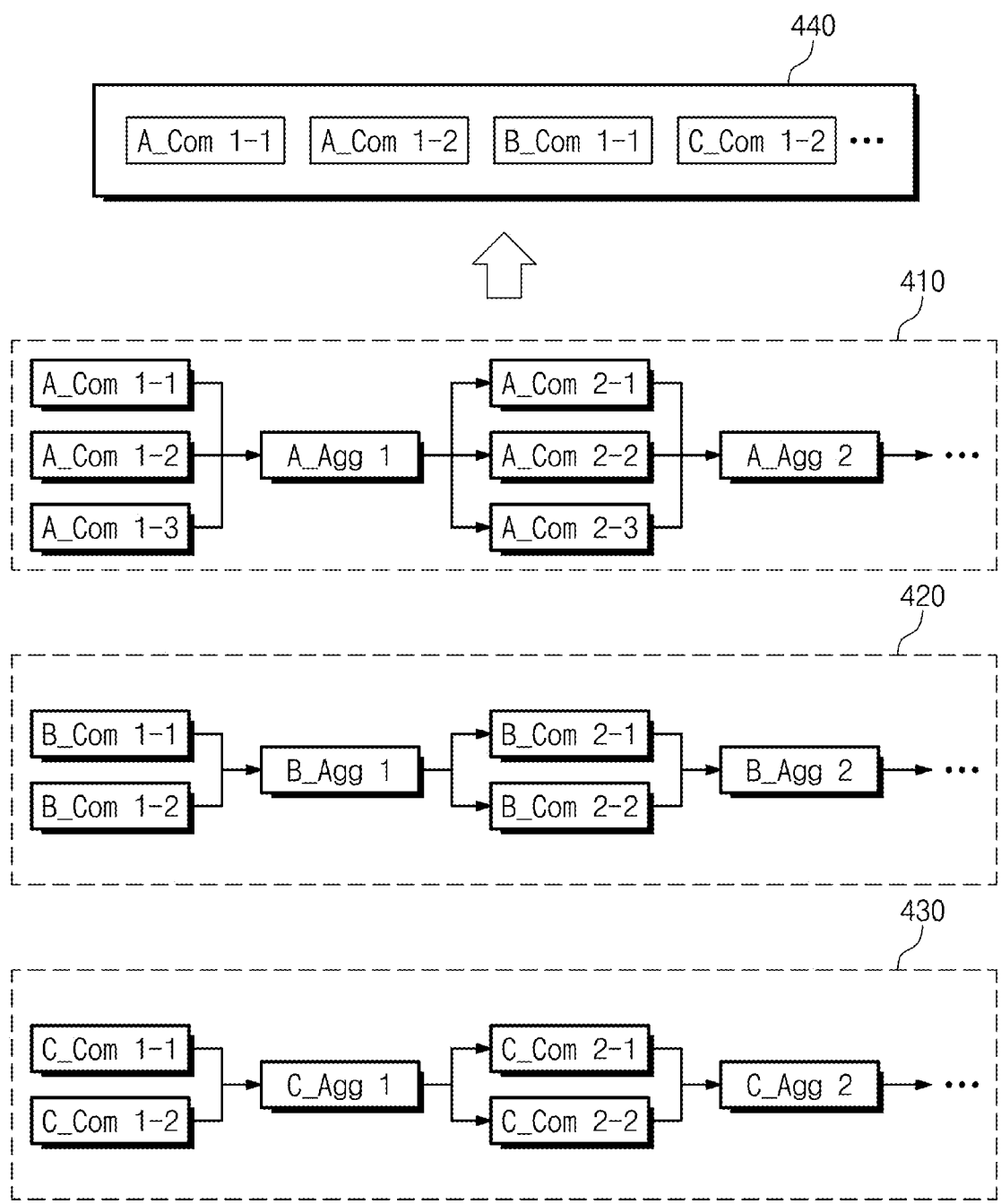
FIGS. 4A to 4C are diagrams for describing an operation in which a training system according to an embodiment performs a plurality of training jobs.
Figure 4B:
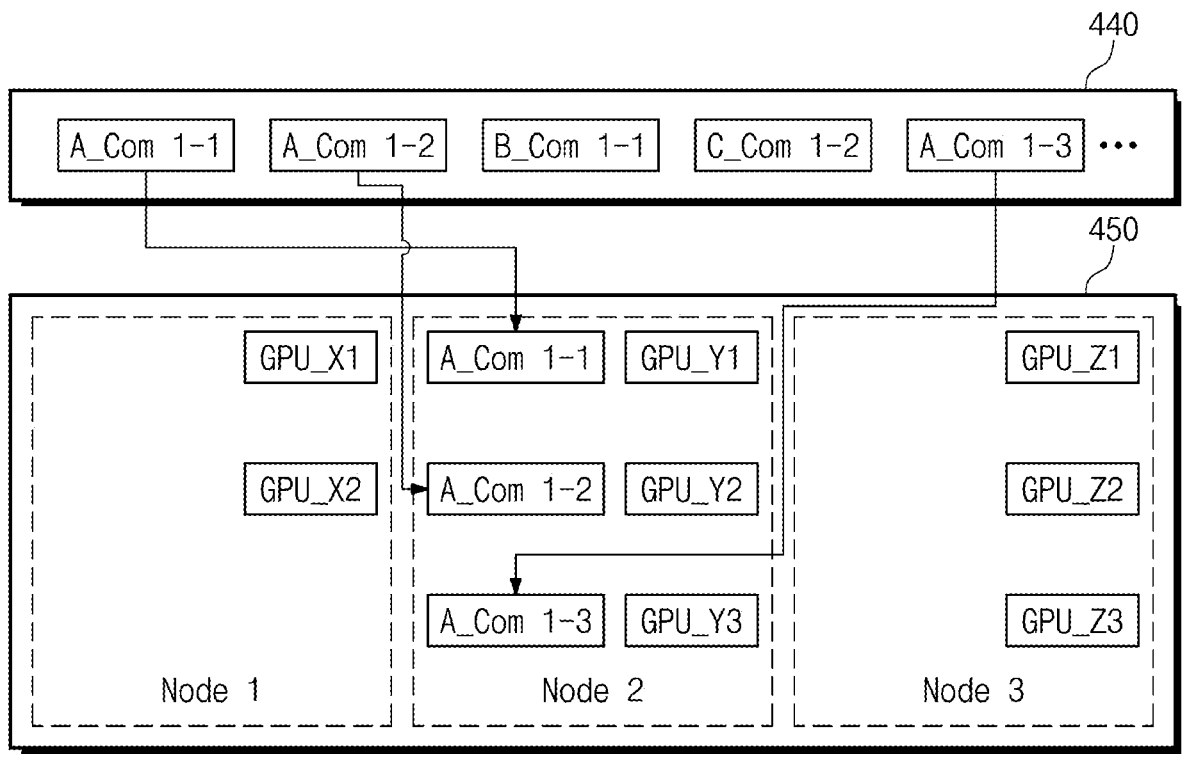
Figure 4C:
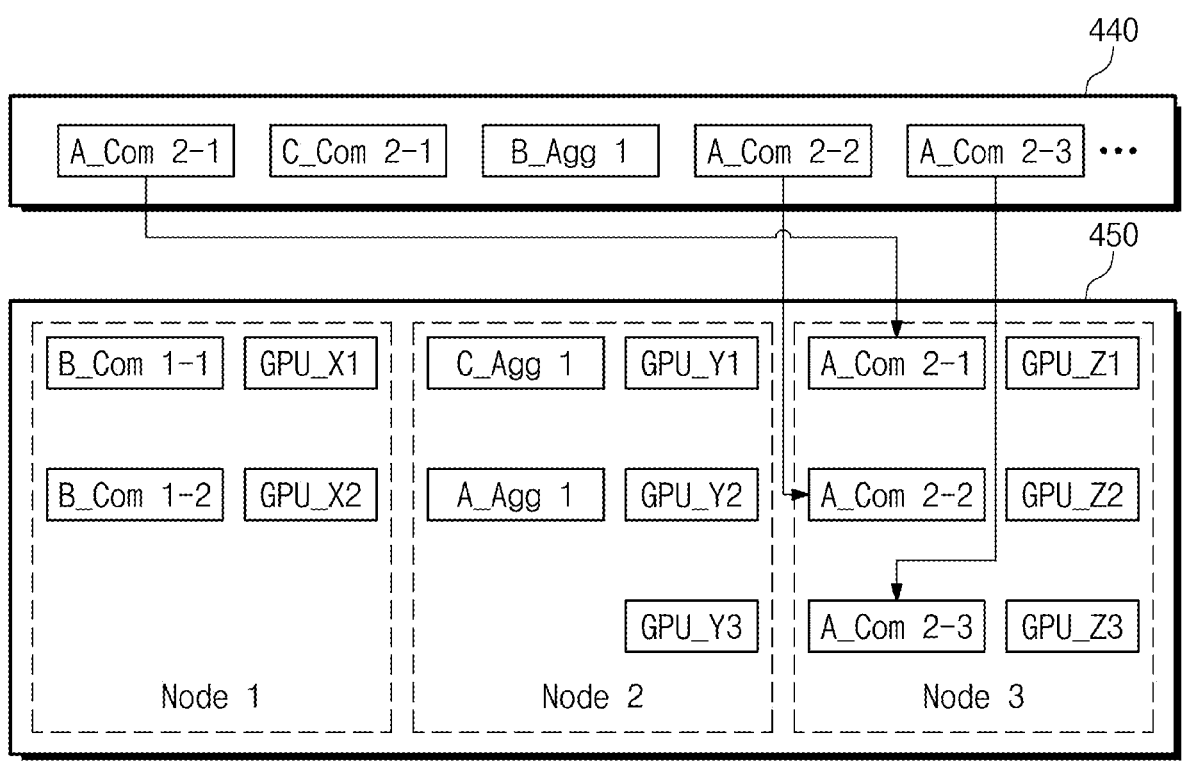

FIGS. 4A to 4C are diagrams for describing an operation in which a training system according to an embodiment performs a plurality of training jobs. Referring to FIGS. 4A to 4C, a plurality of training jobs may include first to third training jobs 410, 420, and 430. The first to third training jobs 410, 420, and 430 may perform training on different training models. Each of the first to third training jobs 410, 420, and 430 may be executed by one or more virtual workers.

The first training job 410 may be executed in a sequence of first microservices A_Com 1-1, A_Com 1-2, A_Com 1-3, A_Agg 1, A_Com 2-1, A_Com 2-2, A_Com 2-3, and A_Agg 2. The first microservices A_Com 1-1, A_Com 1-2, A_Com 1-3, A_Agg 1, A_Com 2-1, A_Com 2-2, A_Com 2-3, and A_Agg 2 may be classified into first-type microservices A_Com 1-1, A_Com 1-2, A_Com 1-3, A_Com 2-1, A_Com 2-2, and A_Com 2-3 and second-type microservices A_Agg 1 and A_Agg 2.

The first-type microservices A_Com 1-1, A_Com 1-2, A_Com 1-3, A_Com 2-1, A_Com 2-2, and A_Com 2-3 may mean processing of one or more mini-batches, for example, a forward pass or a backward pass. The first-type microservices A_Com 1-1, A_Com 1-2, A_Com 1-3, A_Com 2-1, A_Com 2-2, and A_Com 2-3 may include first partial microservices A_Com 1-1, A_Com 1-2, and A_Com 1-3 and second partial microservices A_Com 2-1, A_Com 2-2, and A_Com 2-3.

The second-type microservices A_Agg 1 and A_Agg 2 may include a first aggregation microservice A_Agg 1 and a second aggregation microservice A_Agg 2. The first aggregation microservice A_Agg 1 may aggregate parameters generated by the first partial microservices A_Com 1-1, A_Com 1-2, and A_Com 1-3, and the second aggregation microservice A_Agg 2 may aggregate parameters generated by the second partial microservices A_Com 2-1, A_Com 2-2, and A_Com 2-3.

That is, the first training job 410 may be executed in a sequence of the first partial microservices A_Com 1-1, A_Com 1-2, and A_Com 1-3, the first aggregation microservice A_Agg 1, the second partial microservices A_Com 2-1, A_Com 2-2, and A_Com 2-3, and the second aggregation microservice A_Agg 2.

According to an embodiment, the first partial microservices A_Com 1-1, A_Com 1-2, and A_Com 1-3 may be executed in parallel by one or more virtual workers, and the first aggregation microservice A_Agg 1 may be executed together by the one or more virtual workers. For example, a first virtual worker may execute a (1-1)-th microservice A_Com 1-1, a second virtual worker may execute a (1-2)-th microservice A_Com 1-2, and a third virtual worker may execute a (1-3)-th microservice A_Com 1-3. In this case, the first to third virtual workers may execute the first aggregation microservice A_Agg 1 together.

According to an embodiment, the second partial microservices A_Com 2-1, A_Com 2-2, and A_Com 2-3 may be executed in parallel by one or more virtual workers, and the second aggregation microservice A_Agg 2 may be executed together by the one or more virtual workers. For example, the first virtual worker may execute a (2-1)-th microservice A_Com 2-1, the second virtual worker may execute a (2-2)-th microservice A_Com 2-2, and the third virtual worker may execute a (2-3)-th microservice A_Com 2-3. In this case, the first to third virtual workers may execute the second aggregation microservice A_Agg 2 together.

A first job proxy associated with the first training job 410 may submit the first microservices A_Com 1-1, A_Com 1-2, A_Com 1-3, A_Agg 1, A_Com 2-1, A_Com 2-2, A_Com 2-3, and A_Agg 2 to a scheduler 440. In this case, the first job proxy may transfer information of the first microservices A_Com 1-1, A_Com 1-2, A_Com 1-3, A_Agg 1, A_Com 2-1, A_Com 2-2, A_Com 2-3, and A_Agg 2 together. For example, the first job proxy may transfer type information and sequence information of the first microservices A_Com 1-1, A_Com 1-2, A_Com 1-3, A_Agg 1, A_Com 2-1, A_Com 2-2, A_Com 2-3, and A_Agg 2 to the scheduler 440.

The second training job 420 may be executed in a sequence of second microservices B_Com 1-1, B_Com 1-2, B_Agg 1, B_Com 2-1, B_Com 2-2, and B_Agg 2. A second job proxy associated with the second training job 420 may submit the second microservices B_Com 1-1, B_Com 1-2, B_Agg 1, B_Com 2-1, B_Com 2-2, and B_Agg 2 to the scheduler 440. The third training job 430 may be executed in a sequence of third microservices C_Com 1-1, C_Com 1-2, C_Agg 1, C_Com 2-1, C_Com 2-2, and C_Agg 2. A third job proxy associated with the third training job 430 may submit the third microservices C_Com 1-1, C_Com 1-2, C_Agg 1, C_Com 2-1, C_Com 2-2, and C_Agg 2 to the scheduler 440. Below, descriptions associated with the second training job 420 and the third training job 430 are similar to the description associated with the first training job 410, and thus, additional description will be omitted to avoid redundancy.

The scheduler 440 may schedule the first to third microservices so as to be executed by heterogeneous graphic processing units (GPUs) included in a cluster. According to an embodiment, based on at least one of a locality or a quality of service (QoS) of each of the microservices, the scheduler 440 may schedule microservices so as to be executed by heterogeneous graphic processing units.

Referring to FIGS. 4A and 4B, the first partial microservices A_Com 1-1, A_Com 1-2, and A_Com 1-3 among the first to third microservices may be in a state of being submitted to the scheduler 440. The first partial microservices A_Com 1-1, A_Com 1-2, and A_Com 1-3 may be scheduled to be executed by a cluster 450.

The cluster 450 may include a first node Node 1, a second node Node 2, and a third node Node 3. First GPUs GPU_X1 and GPU_X2 may be placed at the first node Node 1. Second GPUs GPU_Y1, GPU_Y2, and GPU_Y3 may be placed at the second node Node 2. Third GPUs GPU_Z1, GPU_Z2, and GPU_Z3 may be placed at the third node Node 3. The first GPUs GPU_X1 and GPU_X2, the second GPUs GPU_Y1, GPU_Y2, and GPU_Y3, and the third GPUs GPU_Z1, GPU_Z2, and GPU_Z3 may be homogeneous or heterogeneous.

The scheduler 440 may schedule the first partial microservices A_Com 1-1, A_Com 1-2, and A_Com 1-3 so as to be executed by the cluster 450, in consideration of localities thereof. For example, the first partial microservices A_Com 1-1, A_Com 1-2, and A_Com 1-3 may be scheduled to be respectively executed by the second GPUs GPU_Y1, GPU_Y2, and GPU_Y3. In this case, the second GPUs GPU_Y1, GPU_Y2, and GPU_Y3 may be placed at the second node Node 2 such that the first partial microservices A_Com 1-1, A_Com 1-2, and A_Com 1-3 may be executed at the same node. When microservices are executed at the same node, the cluster 450 may store computed weights at the same node. As such, the first aggregation microservice A_Agg 1 may quickly read the weights of the first partial microservices A_Com 1-1, A_Com 1-2, and A_Com 1-3 in weight aggregation.

Referring to FIGS. 4A to 4C, the second partial microservices A_Com 2-1, A_Com 2-2, and A_Com 2-3 among the first to third microservices may be in a state of being submitted to the scheduler 440. The second partial microservices A_Com 2-1, A_Com 2-2, and A_Com 2-3 may be scheduled to be executed by the cluster 450.

According to an embodiment, the first GPUs GPU_X1 and GPU_X2, the second GPUs GPU_Y1, GPU_Y2, and GPU_Y3, and the third GPUs GPU_Z1, GPU_Z2, and GPU_Z3 may be heterogeneous, and performance of the third GPUs GPU_Z1, GPU_Z2, and GPU_Z3 may be higher than performance of the first GPUs GPU_X1 and GPU_X2 and the second GPUs GPU_Y1, GPU_Y2, and GPU_Y3. The scheduler 440 may schedule the second partial microservices A_Com 2-1, A_Com 2-2, and A_Com 2-3 so as to be executed by the cluster 450, in consideration of a quality of service (QoS).

When the first partial microservices A_Com 1-1, A_Com 1-2, and A_Com 1-3 are executed by the second GPUs GPU_Y1, GPU_Y2, and GPU_Y3, the scheduler 440 may monitor the throughput of the first training job 410. When the throughput of the first training job 410 is smaller than a given throughput, the second partial microservices A_Com 2-1, A_Com 2-2, and A_Com 2-3 may be scheduled to be executed by the third GPUs GPU_Z1, GPU_Z2, and GPU_Z3.

In this case, if other microservices are being executed by the third GPUs GPU_Z1, GPU_Z2, and GPU_Z3, the scheduler 440 may perform scheduling such that the second partial microservices A_Com 2-1, A_Com 2-2, and A_Com 2-3 are executed immediately after the execution of other microservices is finished. That is, the scheduler 440 may wait until a training job being executed by the third GPUs GPU_Z1, GPU_Z2, and GPU_Z3 is finished or may perform efficient scheduling based on microservices without preemptive processing of the training job.

A typical worker has performed one training job using one GPU in a monolithic manner, but the disclosed system may perform a plurality of training jobs by flexibly using heterogeneous GPUs based on a microservice execution technique, not monopolizing the heterogeneous GPUs. That is, the microservice-based training system may perform training on a plurality of training models by executing a plurality of training jobs in parallel by using one heterogeneous-GPU cluster.

Figure 5:
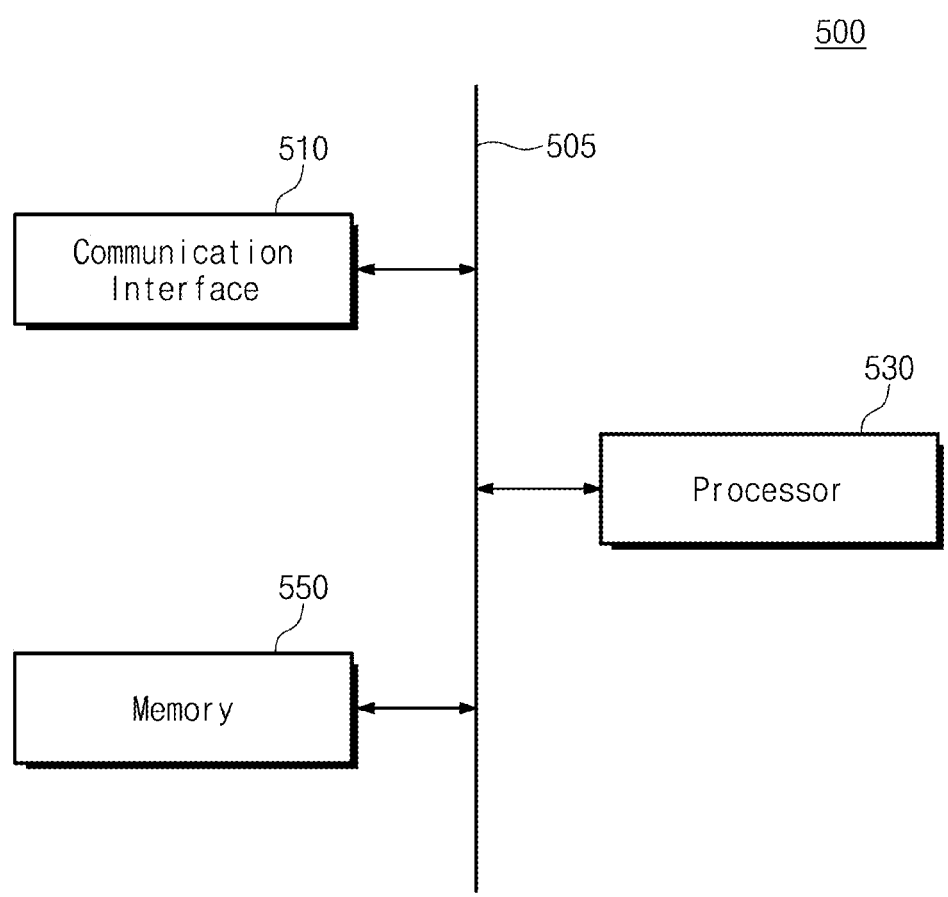
FIG. 5 is a block diagram of a training system according to an embodiment.

FIG. 5 is a block diagram of a training system according to an embodiment. Referring to FIG. 5, a training system 500 according to an embodiment may include a communication interface 510, a processor 530, and a memory 550. The communication interface 510, the processor 530, and the memory 550 may communicate with each other through a communication bus 505.

The communication interface 510 may receive a training request including training data from the user.

The processor 530 may partition a job for training into tasks corresponding to virtual workers of a neural network model in response to the training request. In this case, the tasks may be performed in the form of microservices. The processor 530 may schedule the microservices so as to be executed by heterogeneous graphic processing units included in each of clusters for the neural network model. The processor 530 may allow the virtual workers to train the neural network model, based on the scheduling.

The memory 550 may store pieces of information generated in the processing of the processor 530 described above. In addition, the memory 550 may store various kinds of data and programs. The memory 550 may include a volatile memory or a nonvolatile memory. The memory 550 may include a high-capacity storage medium, such as a hard disk drive, to store various kinds of data.

In addition, the processor 530 may perform at least one of the methods described with reference to FIGS. 1 to 4C or may perform an algorithm corresponding to the at least one method. The processor 530 may be a data processing device implemented with hardware including a circuit of a physical structure for executing desired operations. For example, the desired operations may include a code or instructions included in a program. For example, a device implemented with hardware may include a microprocessor, a central processing unit, a processor core, a multi-core processor, a multiprocessor, an application specific integrated circuit (ASIC), a field programmable gate array (FPGA), etc.

The processor 530 may execute a program and may control the training system 500. A program code that is executed by the processor 530 may be stored in the memory 550. The processor 530 may be implemented with a central processing unit (CPU), a graphic processing unit (GPU), and a neural-network processing unit (NPU).

The methods according to the above-described embodiments may be recorded in a computer-readable medium including program instructions that are executable through various computer devices. The computer-readable medium may also include program instructions, data files, data structures, or a combination thereof. The program instructions recorded in the medium may be designed and configured specially for the embodiments or be known and available to those skilled in computer software. The computer-readable medium may include a hardware device, which is specially configured to store and execute program instructions, such as magnetic media (e.g., a hard disk drive and a magnetic tape), optical recording media (e.g., CD-ROM and DVD), magneto-optical media (e.g., a floptical disk), read only memories (ROMs), random access memories (RAMs), and flash memories. Examples of computer programs include not only machine language codes created by a compiler, but also high-level language codes that are capable of being executed by a computer by using an interpreter or the like. The described hardware devices may be configured to act as one or more software modules to perform the operations of the above-described embodiments, or vice versa.

Software may include computer programs, codes, instructions, or a combination thereof and configure a processing unit to operate in a desired manner or independently or collectively control the processing unit. Software and/or data may be permanently or temporarily embodied in any type of machine, component, physical equipment, virtual equipment, computer storage medium or unit or transmitted signal waves so as to be interpreted by the processing unit or to provide instructions or data to the processing unit. Software may be dispersed throughout computer systems connected over networks and be stored or executed in a dispersion manner. Software and data may be recorded in one or more computer-readable storage medium.

According to one aspect, multiple training jobs may be executed more efficiently by using one heterogeneous-GPU cluster.

According to one aspect, a deep neural network composed of a cluster including heterogeneous graphic processing units may be trained through microservice-based machine learning.

According to one aspect, a complex deep learning model may be trained more efficiently by partitioning the deep learning model by a function unit of a microservice concept and training the deep learning model at heterogeneous processors.

According to one aspect, machine learning may be performed more efficiently by scheduling microservices depending on performance of heterogeneous processors.

According to one aspect, training of a monolithic deep neural network model may be performed by modularizing the neural network model based on microservices such that there is performed distributed processing using a cluster including heterogeneous graphic processing units.

According to one aspect, there may be provided a training system with high fairness, scalability, efficiency, and elasticity by reducing the complexity of managing heterogeneous resources in a multi-tenant graphic processing unit cluster supporting a plurality of training jobs at the same time.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operating method of a training system which performs training on a plurality of neural network models in parallel, the method comprising:
   receiving a training request for the plurality of neural network models including a first neural network model and a second neural network model;
   partitioning a first training job corresponding to the first neural network model into first microservices;
   partitioning a second training job corresponding to the second neural network model into second microservices;
   dynamically scheduling the first microservices and the second microservices so as to be executed by heterogeneous processing units; and
   sequentially executing the first microservices and sequentially executing the second microservices,
      wherein the partitioning of the first training job into the first microservices includes,
      partitioning first training data associated with the first training job into first mini-batches; and
      causing processing for each of the first mini-batches to correspond to the first microservices, and
   wherein the partitioning of the second training job into the second microservices includes:
      partitioning second training data associated with the second training job into second mini-batches; and
      causing processing for each of the second mini-batches to correspond to the second microservices.

2. The method of claim 1, wherein the partitioning of the first training job into the first microservices further includes:
   classifying the first microservices into first-type microservices computing first parameters for the first mini-batches through a forward pass or a backward pass for each of the first mini-batches, and second-type microservices aggregating the first parameters, and
   wherein the partitioning of the second training job into the second microservices further includes:
   classifying the second microservices into third-type microservices computing second parameters for the second mini-batches through a forward pass or a backward pass for each of the second mini-batches, and fourth-type microservices aggregating the second parameters.

3. The method of claim 2, wherein the scheduling includes:
   scheduling the first microservices and the second microservices based on at least one of a locality and a quality of service of each of the first microservices and the second microservices, so as to be executed by the heterogeneous processing units.

4. The method of claim 3, wherein the scheduling based on the locality includes:
   scheduling first partial microservices, which are executed in parallel, from among the first microservices and the second microservices, so as to be executed by first processing units placed at the same node from among the heterogeneous processing units.

5. The method of claim 4, wherein the scheduling based on the quality of service includes:
   scheduling second partial microservices, which are executed in parallel, from among the first microservices and the second microservices, so as to be executed by second processing units, of which a processing speed is higher than a processing speed of the first processing units, from among the heterogeneous processing units, and
   wherein the second partial microservices are executed in parallel at a timing different from that of the first partial microservices.

6. The method of claim 1, wherein the executing includes:
   executing the first training job in a sequence of the first microservices; and
   executing the second training job in a sequence of the second microservices, and
   wherein the first training job and the second training job are executed in parallel based on the first microservices and the second microservices.

* * * * *